(12) United States Patent
Wu et al.

(10) Patent No.: US 8,724,168 B2
(45) Date of Patent: May 13, 2014

(54) UPDATING A SMOOTHNESS CONSTRAINED CLUSTER MODEL FOR COLOR CONTROL IN A COLOR MANAGEMENT SYSTEM

(75) Inventors: Wencheng Wu, Webster, NY (US); Lalit Keshav Mestha, Fairport, NY (US); Edual N. Dalal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 713 days.

(21) Appl. No.: 12/969,854

(22) Filed: Dec. 16, 2010

(65) Prior Publication Data

US 2012/0154831 A1 Jun. 21, 2012

(51) Int. Cl.
*G06F 15/00* (2006.01)
(52) U.S. Cl.
USPC .......... 358/1.9; 358/3.03; 358/3.06; 358/504; 358/1.15; 382/167
(58) Field of Classification Search
USPC ....................................................... 358/1.15
See application file for complete search history.

(56) References Cited

U.S. PATENT DOCUMENTS

| 7,383,261 | B2 | 6/2008 | Mestha et al. | |
|---|---|---|---|---|
| 7,839,498 | B2 | 11/2010 | Mestha et al. | |
| 2004/0257596 | A1* | 12/2004 | Mestha et al. | 358/1.9 |
| 2006/0098865 | A1* | 5/2006 | Yang et al. | 382/159 |
| 2009/0296107 | A1 | 12/2009 | Mestha et al. | |
| 2010/0039657 | A1* | 2/2010 | Wang et al. | 358/1.9 |

OTHER PUBLICATIONS

Dalal, et al., "Color Mapping Determination for an N-Color Marking Device Based Upon Image Spatial Noise Defects", U.S. Appl. No. 12/727,760, filed Mar. 19, 2010.
Wu, et al., "Image Quality Performance for a Color Marking Device", U.S. Appl. No. 12/727,692, filed Nov. 9, 2010.
Wu, et al., "Updating an Image Quality Metric Database to Account for Printer Drift", U.S. Appl. No. 12/781,988, filed May 18, 2010.
Dalal, et al., "Color Mapping Determination for an N-Color Marking Device Based Upon Image Spatial Noise Defects", U.S. Appl. No. 12/727,791, filed Mar. 19, 2010.
Bensmail, H., et al., "Inference in Model-Based Cluster Analysis", Journal of Statistical Computing, 7:1-10, (1997).
Schwartz, G., "Estimating the Dimension of a Model", Annals of Statistics, 6(2):461-464, (1978).
Edward S. Boyden III, "Tree-based Cluster Weighted Modeling: Towards a Massively Parallel Real-Time Digital Stradivarius", MIT Media Lab, class project for Neural Networks (9.641), (Fall 1997).

* cited by examiner

*Primary Examiner* — Barbara Reinier
*Assistant Examiner* — Brendan McCommas
(74) *Attorney, Agent, or Firm* — Philip E. Blair; Fleit Gibbons Gutman Bongini & Bianco P.L.

(57) ABSTRACT

What is disclosed is a novel system and method for updating a cluster model for color control. In one example embodiment, a cluster model is received and analyzed to identify clusters therein. Each of the identified clusters has an associated transform. Thereafter, in response to a threshold event having occurred, a critical cluster is identified and a critical color is identified from the cluster. Steps for identifying a critical color are more fully described herein. A selected number of patches is then printed in each of the critical colors and color measurements are obtained from the printed patches using, for instance, a colorimeter or spectrophotometer. If the color measurements have deviated beyond a defined threshold, then update the cluster model by: updating the transform associated with the cluster; redefining the number of clusters; redefining a center of any of the clusters; or redefining a boundary of the clusters.

4 Claims, 8 Drawing Sheets

UPDATING A SMOOTHNESS CONSTRAINED CLUSTER MODEL FOR COLOR CONTROL IN A COLOR MANAGEMENT SYSTEM

TECHNICAL FIELD

The present invention is directed to systems and methods for updating a cluster model for color control in a color management system.

BACKGROUND

In digital imaging systems, color management is the controlled conversion between the color representations of various devices, such as image scanners, digital cameras, monitors, TV screens, film printers, office printers, offset presses, corresponding media, and the like. Although the primary goal of color management is to produce accurate color, due to the redundancy resulting from the use of four or more colorants, additional functionality may be obtained. One example of additional functionality that a color management system can provide is improved smoothness of an image. Empirical or interpolation-based approaches treat the print device as a black box between inputs and outputs. Analytical first principle approaches attempt to characterize the device color response using the fewest number of measurements to arrive at analytical functions that physically represent the process. Both approaches are capable of predicting the response of the device for a variety of input images. However, as the number of color separations increases, analytical first principle models require more time and effort to develop. Instead, empirical data-rich methods are utilized, namely, parameterized multi-variable and cluster models. There are advantages in the cluster model over other empirical approaches. Such advantages include, for example, the ability to better represent the response of a marking device with existing models, and/or the ability to utilize simpler models. It can take significant effort to build a full cluster model.

Accordingly, what is needed in this art are systems and methods for updating a cluster model in a color management system with less effort than would be required to rebuild the cluster model.

INCORPORATED REFERENCES

The following U.S. patents, U.S. patent applications, and Publications are incorporated herein in their entirety by reference.

"Image Quality Performance For A Color Marking Device", U.S. patent application Ser. No. 12/727,692, by Wu et al.

"Updating An Image Quality Metric Database To Account For Printer Drift", U.S. patent application Ser. No. 12/781,988, by Wu et al.

"Reference Database And Method For Determining Spectra Using Measurements From An LED Color Sensor, And Method Of Generating A Reference Database", U.S. Pat. No. 7,839,498 and U.S. Pat. No. 7,383,261, both to Mestha et al.

BRIEF SUMMARY

What is disclosed is a novel system and method for updating a cluster model for color control in a color management system. In one example embodiment, the present method for updating a cluster model involves receiving a cluster model designed for a color marking device and analyzing the structure of the cluster model to identify a plurality of clusters defined therein. Each of the clusters has at least one centroid of an input color space of the color marking device. Each of the identified clusters has a transform associated therewith such as, for example, a regression matrix. In response to a threshold event having occurred such as, for instance, a print engine of the color marking device having drifted beyond a predetermined amount, at least one critical cluster is identified from the plurality of clusters and one or more critical colors are identified from that critical cluster. Steps for identifying the critical color from each of the critical clusters are more fully described herein further. A selected number of patches is then printed in the identified critical colors and color measurements are obtained from the printed patches. If the color measurements have deviated beyond a defined threshold, then the cluster model is updated. In various embodiments hereof, updating the cluster model comprises updating the transform associated with any of the clusters thereof; redefining a total number of clusters in the cluster model; redefining a center of any of the clusters; or redefining a boundary of any of the clusters. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed is a novel system and method for updating a cluster model for color control in a color management system.

It should be understood that one of ordinary skill in this art should be readily familiar with the various aspects of color space, color manipulation, color rendering, device profiles, and the like. Those of ordinary skill in this art would be familiar with the text: *"Digital Color Imaging Handbook"*, 1st Ed., CRC Press (2003), ISBN-13: 97808-4930-9007, and *"Control of Color Imaging Systems: Analysis and Design"*, CRC Press (2009), ISBN-13: 97808-4933-7468, both of which are incorporated herein in their entirety by reference.

NON-LIMITING DEFINITIONS

A "critical color" is a color which contributes significantly to the change of parameters in the cluster model representing a color marking device. For example, for a cluster model consisting of multiple clusters with associated centroid and regression matrix for each cluster, critical colors are the colors corresponding to the points with high sensitivity (slopes) in the regression matrix, and/or colors that are located at or near the boundary between clusters in the cluster model.

A "critical cluster" is a cluster of color space containing the critical color. Thus in the above example, it is the cluster that contains the identified boundary region between clusters in the cluster model.

A "centroid" of an object X in n-dimensional space is the intersection of all hyperplanes that divide object X into parts of equal moment about the hyperplane. Informally, it is the average of all points of X and defines a 'center' of the object. For an object of uniform composition, the centroid of an object is the object's center of mass. Standard integrations for calculating a centroid are as follows:

$$C_y = \frac{\int y dA}{A} C_y = \frac{\int y dA}{A} \text{ and } C_x = \frac{\int x dA}{A} . C_x = \frac{\int x dA}{A}. \quad (1)$$

where $C_x$ is the distance from the y-axis to the centroid, $C_y$ is the distance from the x-axis to the centroid, such that the coordinates of the centroid are ($C_x, C_y$). The reader is directed to the following texts, *Handbook of Mathematics* 5$^{th}$ Ed., Springer (2007), ISBN-13: 978-3540721215, and *CRC Standard Mathematical Tables and Formulae*, 31$^{st}$ Ed., Chapman and Hall (2002), ISBN-13: 978-1584882916, and/or Example 7.1 of: *Control of Color Imaging Systems: Analysis and Design*, CRC Press (2009), ISBN-13: 97808-4933-7468, all of which are incorporated herein in their entirety by reference.

A "cluster model", as used herein, is a model which defines a plurality of clusters, each defined by a boundary surface, in a n-dimensional color space. Each cluster can be identified by a centroid or by its boundary surface. In the case of clusters identified by centroids, a distance measure is used to determine a nearest center. The cluster model may contain information about the distance measure and/or similarity measures used for clustering. It may also contain statistical information regarding data distribution such as the covariance matrix. Each cluster has an associated transform function, as defined above.

Without loss of generality, a cluster model is a data-driven or an algorithmic-based approach operating on a set of experimental input-output map—a non-linear prediction of dependent variables (outputs) from a set of independent variables (inputs) based upon some density estimation using a set of clusters that are each notionally appropriate in a sub-region of the input space. This density might be a Gaussian centered at a parameter representing the cluster center. In the same way as for regression analysis, it will be important to consider preliminary data transformations as part of the overall modeling strategy if the core components of the model are to be simple regression models for the cluster-wise densities, and normal distributions for the cluster-weighting densities. The number of clusters is discoverable using latent class models to find relevant patterns in high-dimensional data.

"Updating the cluster model", as used herein, refers to either updating the transform function associated with one or more clusters of the cluster model; redefining the total number of clusters of the cluster model; redefining a center of any of the clusters of the cluster model; or redefining a boundary of any of the clusters of the cluster model.

"Color marking device" refers to a wide variety of digital document reproduction architectures including: copiers, and digital printing presses. Such systems generally include a display device such as a CRT or touch screen along with one or more user interfaces such as a keyboard, mouse, keypad, touchpad, and the like, for entering data and configuring device-specific settings to optimize image quality and performance.

Example Smoothness Models

Figure 1:
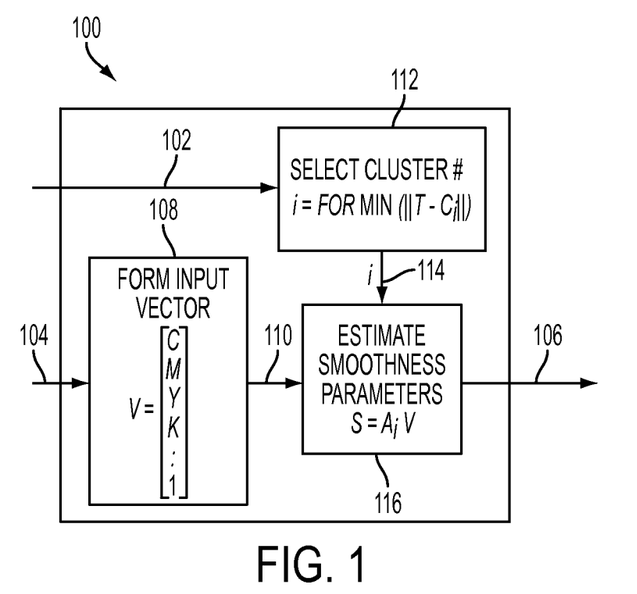
FIG. 1 is an illustration of a smoothness model clustered in Lab space and a smoothness parameter space which is used to estimate various smoothness parameters for print devices.

Reference is now being made to FIG. 1 which is an illustration of a smoothness model clustered in L*a*b* and a smoothness parameter space which is used to estimate various smoothness parameters such as, for instance, NMF, VNHF, VN and VS, which correspond to the Xerox standard (perceptual) smoothness measurement for mottle, graininess, visual noises, and visible screen artifacts, respectively. Other standard smoothness measurements such as those discussed in ISO-13360 can be used as well. In FIG. 1, model 100 receives L*a*b* and optionally at least one desired smoothness parameter as input 102, and receives CMYK (or a CMYK . . . recipe) as input 104. Model 100 comprises a plurality of modules and generates estimated smoothness parameters as output 106. Vector Formation Module 108 forms a vector 110 from the CMYK input 104. Cluster Selection Module 112 selects the cluster that the input 102 belongs to and outputs the cluster index i (at 114) of the selected cluster. Vector $C_i$ is the i$^{th}$ centroid and T is a vector comprised of the received L*a*b* and optionally smoothness parameter vector to which cluster assignment is required. Smooth Parameter Estimation Module 116 uses regression matrix A associated with the i$^{th}$ cluster and vector 110 to generate the estimated smooth parameter(s) 106. To construct the cluster model, clustering may be performed, for example, using a K-means algorithm, as is generally known in this art.

Figure 2:
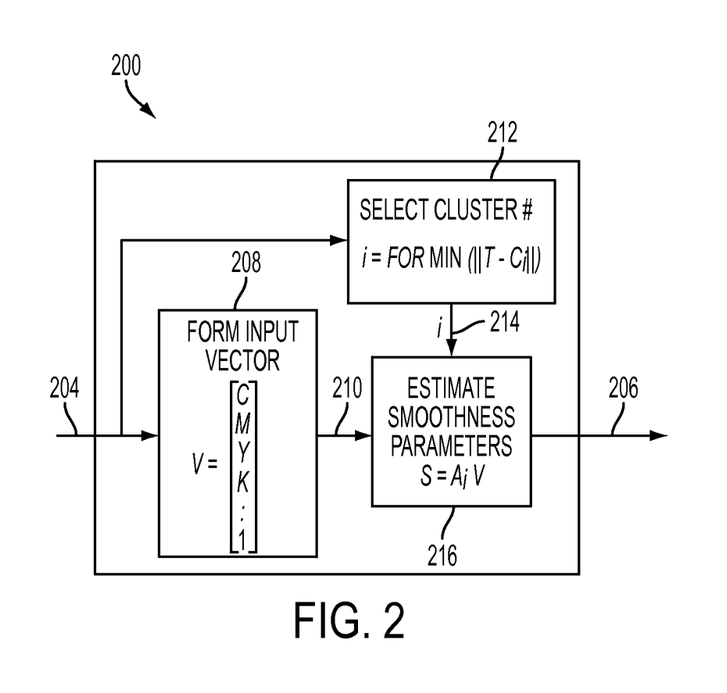
FIG. 2 illustrates an alternate smoothness model clustered in CMYK space which is used for Solid Ink-Jet (SIJ) printers with NMF, VNHF and VS parameters.

Reference is next being made to FIG. 2 which illustrates a smoothness model 200 clustered in CMYK space which is used for Solid Ink-Jet printers (SIJ) with NMF, VNHF, VN and VS parameters. For an SIJ printer, NMF is not so important and image quality parameters such as VN, VNHF, and VS are preferably used instead. For such a model, cluster centroids are computed in CMYK space and all cluster assignments are performed by comparing distances between centroids and the vector T in input space. In this implementation, it is to be noted that vector T does not contain L*a*b* and smoothness parameter(s) as in FIG. 1. In FIG. 2, a CMYK is input, at 204, into both the Vector Formation Module 208 and Cluster Selection Module 212. Vector Formation Module 208 forms a vector 210 from CMYK input 204. Cluster Selection Module 212 selects the cluster that the input 204 belongs to and outputs the cluster index i (at 214) of the selected cluster. Vector $C_i$ is the centroid of the i$^{th}$ cluster, and T is a vector comprised of the received CMYK input. Smoothness Parameter Estimation Module 216 uses regression matrix $A_i$ associated with the i$^{th}$ cluster and vector 210 to generate the estimated smoothness parameter(s) 206.

Example Flow Diagram of One Embodiment

Figure 3:
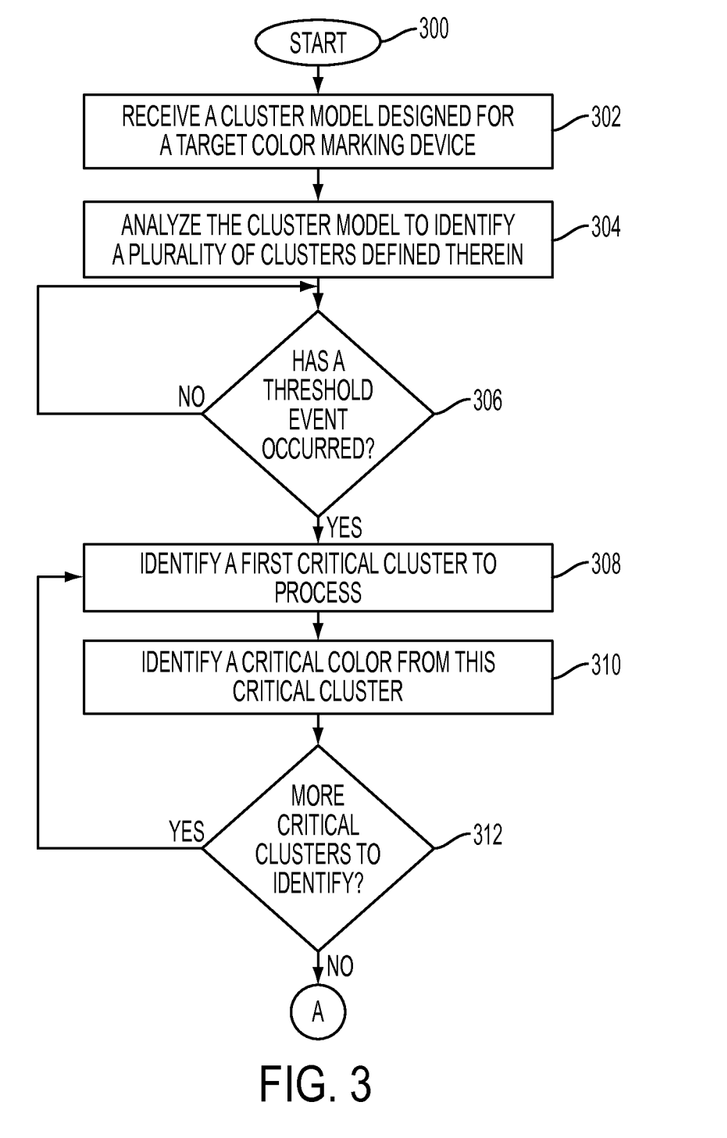
FIG. 3 is a flow diagram of one example embodiment of the present method.

Reference is now being made to the flow diagram of FIG. 3 which illustrates one example embodiment of the present method for updating a cluster model used for color control in a color management system. Flow processing begins at 300 and immediately proceeds to step 302.

At step 302, a cluster model is received. The received cluster model is one which has been designed for a target color marking device. A cluster model designed for a color marking device defines a plurality of clusters of the input color space of that color marking device. Each of the identified clusters has an associated transform function (e.g., regression matrix). Each of the clusters of the cluster model can be identified by a centroid. The cluster model can be received from a computer system or retrieved from a storage device or from a remote device over a wired or wireless network such as the Internet. One such networked computer system is shown and discussed herein further with respect to FIG. 5. A user may enter information pertaining to some or all of the cluster model, critical clusters, critical colors, boundary edges, centroids, and the like, using the graphical user interface of computer workstation 502 of FIG. 5.

At step 304, the structure of the cluster model is analyzed to identify clusters defined therein.

At step 306, a determination is made whether a threshold event has occurred. The threshold event comprises, for example, a print engine of the color marking device having drifted beyond a predetermined amount, or a passage of a predetermined amount of time. In this particular embodiment, processing waits for the threshold event to occur.

At step 308, a first critical cluster is identified from the plurality of clusters in response to the threshold event having occurred. A user can identify or otherwise select one or more critical clusters for processing using the user interface of a computer workstation. Alternatively, one or more critical clusters have been predetermined and a list of critical clusters is retrieved from a storage device or from a remote device over a network for processing in accordance herewith.

At step 310, at least one critical color is identified from the critical cluster. Identifying the critical color can be effectuated in a plurality of ways. First, at least two color points are selected near a boundary edge of the critical cluster. Then, for each of the selected at least two color points, a distance is calculated from this color point to a center of the critical cluster. Based upon the calculated distances of these color points, a critical color is identified. Alternatively, for each of the selected at least two color points, a vector is generated to the center of the critical cluster and the critical color is identified by a directionality of the generated vectors. Alternatively, for each of the selected at least two color points, an output is obtained from the (non-updated) cluster model using each respective color point as input. Thereafter, the critical color is identified based upon the output obtained using the non-updated model.

At step 312, a determination is made whether any more critical clusters remain to be identified. If so then processing proceeds with respect to step 308 wherein a next critical cluster is identified or otherwise selected for processing. Processing repeats wherein one or more critical colors are identified for this next selected critical cluster. Processing continues in such a manner until all desired critical clusters have been selected and at least one critical color has been identified for each of the critical clusters. Once all the critical colors have been identified and a set of critical colors obtained hereby, processing proceeds with respect to step 314.

Figure 4:
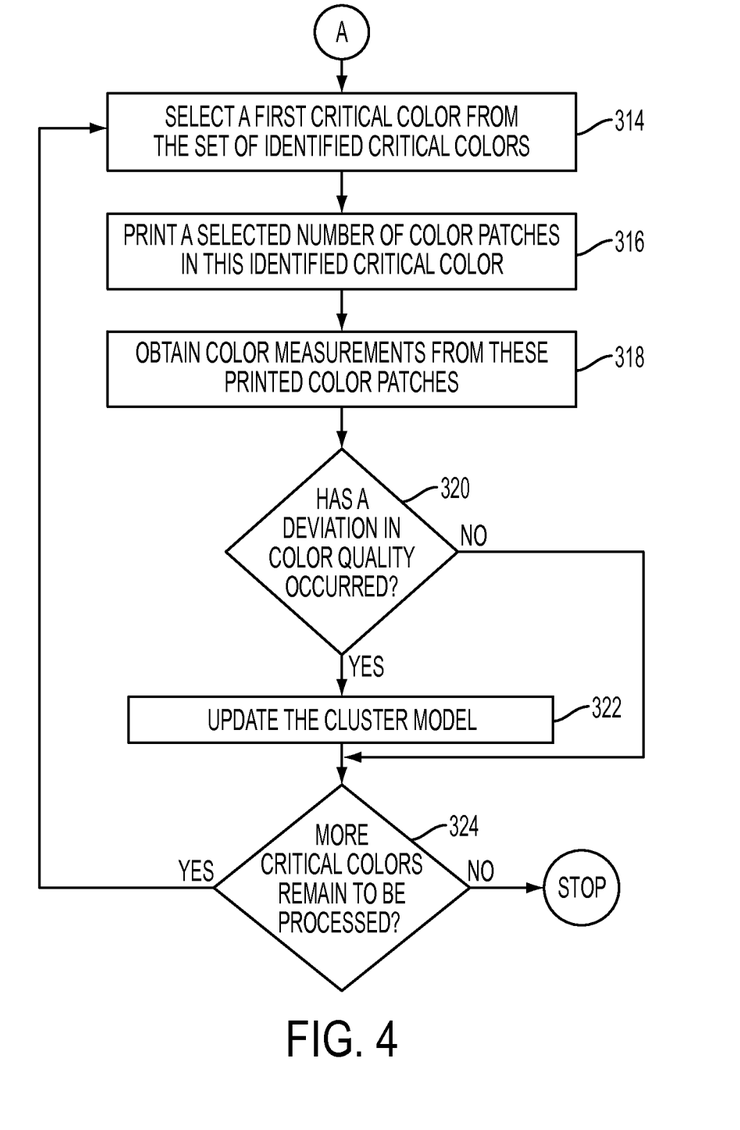
FIG. 4 is a continuation of the flow diagram of FIG. 3 with flow processing continuing with respect to node A.

Reference is now being made to the flow diagram of FIG. 4 which is a continuation of the flow diagram of FIG. 3 with flow processing continuing with respect to node A.

At step 314, a first critical color is selected from the set of critical colors. Critical colors can be individually selected from the set of critical colors using a user interface of a computer workstation. Optionally, one or more critical colors in the set of critical colors is queued or buffered for processing. For each selected critical color, processing continues with respect to step 316.

At step 316, a pre-determined number of patches is printed in this critical color.

At step 318, color measurements are obtained from the printed patches. Color measurements can be readily obtained from a printed test patch using, for instance, a colorimeter or spectrophotometer. Methods for obtaining color measurements from printed color patches are well established in this art.

At step 320, a determination is made whether the obtained color measurements indicate that a deviation has occurred such that color quality is below an acceptable threshold. If not then processing proceeds with respect to step 324 wherein a determination is made whether any more colors from the set of identified critical colors remain to be processed. Otherwise, processing proceeds to step 322.

At step 322, the cluster model is updated. In various embodiments hereof, updating the cluster model comprises updating the transform function associated with the cluster wherein this selected critical color resides. Updating the cluster model may alternatively comprise updating the transform function associated with one or more clusters in the cluster model. Alternatively, updating the cluster model involves redefining a total number of clusters in the cluster model and iterating the method hereof with the redefined clusters. In another embodiment, updating the cluster model involves redefining the centers of some or all of the clusters in the cluster model. Updating the cluster model can further involve redefining a boundary of any of the clusters within the cluster model. Some or all of these may be performed either alone or in combination to update the cluster model.

Updating the model in the field involves, for instance, determining a number of clusters (say for 10 clusters), content of test targets needed for updating, and the location of the centroid for each cluster. The sensitivities of the associated matrices $A_i$'s can be analyzed to determine the number of clusters and the content of test targets (e.g. allocate more samples to those clusters that have smaller training set used for constructing $A_i$). To best allocate the measurement resource for updating the cluster model in the field, an iterative method for further refining the update can be employed. In this embodiment, first update the model parameters based on the measurements of a pre-specific conservative (smaller than needed) set of critical test patches using method described earlier, and then determine the next set of critical test patches for measurements and update based on the changes in the parameters. For example, more samples can be selected for those clusters whose parameters change more and fewer samples (or none) can be selected for those clusters whose parameters change less. Of course, this can be performed over the course of several iterations. At time $t_0$ (e.g. at the manufacturing site), a relatively large training set may be required to determine the number, centroid, and transform function for each cluster in the device's color space.

At step 324, a determination is made whether any more critical colors remain to be selected. If so then processing repeats with respect to step 314 wherein a next critical color is selected. Color patches are then printed in this critical color and color measurements obtained therefrom. A determination is then made with respect to these particular color measurements whether a deviation has occurred such that output quality is below an acceptable threshold. If so then the cluster model is again updated using any of the above-described techniques. Once all the critical colors have been processed accordingly, further processing stops.

Next will be described steps for: (1) Selecting critical test patches; and (2) Updating model parameters from color measurement obtained from the selected critical test patches.

In this section, what is described is an efficient and robust method to select critical test patches for smoothness measurements when an update to the model has been called for. The structure of the model is selected a priori. Color and smoothness parameters (e.g., mottle, halftone noise, graininess) are measured using color and IQAF (a Xerox scanner-based image quality measurement system) procedures. For a xerographic printer, NMF, VNHF, and VS are candidate smoothness parameters. For a SIJ printer, NMF is not as relevant and parameters such as VN, VNHF, and VS are used instead. Here, NMF, VNHF, VN and VS, correspond to the Xerox standard (perceptual) smoothness measurement of mottle, graininess, visual noises and visible screen artifacts, respectively. Other standard smoothness measurements are discussed in ISO-13360. The multi-variable model is used to update the parameters using measurements obtained in the field. Normally for in-field measurements, only color data is available with inline sensors. This partial data is used to estimate the smoothness parameters whenever profile or spot color updates are called for. Measured data is classified into groups and each group is parameterized to construct the model. This enables significantly more accurate models than can be accomplished without clustering.

Using the above-described model of FIG. 2, let us consider selected cluster i, where $S=A_i V$. Here as an example, S is a scalar for the input smoothness parameter NMF, $A_i$ is a 1×5 vector of model parameters to be updated, and V is the input column vector $[C\ M\ Y\ K\ 1]^t$ for an affine model. Higher order terms (e.g., quadratic as in $C^2$, $M^2$ etc., or interactive terms as in CM, MY, etc.,) will be used in the input column vector when higher accuracy is called for. This determines the number of model parameters in the regression matrix $A_i$. Since this is a linear model, it can be shown that, if we assume that the measurement noises are independent, identical, and distributed, it is preferable to distribute the test patches on opposite sides of the center of the cluster and as far from it as possible but not so far that it would fall into another cluster. With that in mind, one can first start out with a list of CMYK values from a dense uniform sampling in CMYK space, calculate their corresponding distances to the nearest center thus define the cluster it belongs to and the distance from the center, and select the CMYK values for each cluster based on distance to the center (in descending order) and/or directionality to the center (assessed by e.g. inner product of the vectors to the center). To guarantee robustness of the fitting, one can also include the centers of each cluster. Additionally or optionally, one can also look at the sensitivity of regression matrix ($A_i$) at each CMYK (i.e., the sensitivities/magnitudes of the CMYK variations to smoothness at each CMYK value) as a selection criterion. A simple measure for sensitivity would be the difference between the estimated S for nominal CMYK and the estimated S for the perturbed CMYK (e.g. increase a small amount in C from the nominal CMYK) divided by the amount of perturbation using the non-updated model (i.e. measuring Jacobian matrix of $A_i$). In this case, one could start out with a list of CMYK values from a dense uniform sampling in CMYK space, calculate the corresponding estimated S of each CMYK value and its neighboring CMYK values using the current (non-updated) cluster model, measure the sensitivities as mentioned above, and select the CMYK values for each cluster based on the estimated sensitivities (in descending order). One can also assign a different number of test patches for each cluster based on the size of the cluster (e.g. how much CMYK space the cluster covers). To do that, again start out with a list of CMYK values from a dense uniform sampling in CMYK space, determine the cluster for each CMYK, count the number of CMYK values in each cluster, and determine the relative number of test patches for each cluster based on the counts. To sum up, one embodiment for selecting critical test patches involves the following steps:

Specify a total number of test patches to be used based on measurement cost in the field, model update accuracy requirements, etc.

Start with a list of CMYK values from a dense uniform sampling in CMYK space.

Identify the cluster each CMYK point belongs to.

Calculate its distance to the center, the vector to the center, and the sensitivities to smoothness (e.g. NMF) based on current (non-updated) cluster model parameters.

Evenly assign the numbers of samples for each cluster. Optionally assign non-uniform numbers of samples for each cluster based on the size of each cluster.

Identify the test patches for each cluster based on the distance to the center (the larger the better), and/or the directionality to the center (pick an alternate side to the center, i.e., inner product of two vectors to the center is negative), and/or the estimated sensitivities to smoothness from the non-updated cluster model (the larger the better).

Once these critical test-patches are selected, print and measure them whenever cluster model updating is called for. These measurements will then be used to update the model parameters for the cluster model. Critical test patch selection may be repeated in the field as needed, especially when drastic changes are called for (e.g., material change).

In this section, we will discuss updating the parameterized multi-variable and cluster model based on a small set of new measurements obtained in the field. It should be appreciated that, in a most likely scenario, the structure of the cluster model is selected a priori at some initial point $t_0$ (e.g., time of manufacture) through analysis on a large training set of test patches when the smoothness measurements are more affordable. The structure here refers to the number of clusters, corresponding centers, and corresponding associated matrices. Thus, there are multiple levels of update in the field that can occur depending on the set of new measurements that can be gathered in the field. In order to update the model parameters, color (and optionally smoothness parameters) of a set of printed test patches are measured using an inline spectrophotometer (ILS) and scanner, respectively. These measurements and their input CMYK parameters are then used to update the cluster model parameters at the desired level. To do this effectively, one would print a small set of critical test patches identified using the methods described above. The numbers of this small set of critical test patches would increase as one goes deeper and deeper in the level of updating, as will be next described.

Level 1: Update Regression Matrix while Keeping the Number of Clusters and Cluster Centers Unchanged Established recursive methods can be employed for updating the regression matrix $A_i$ only as new measurements/observations from critical test-patches in cluster i come in. That is, one can update the regression matrix recursively based on k+1 test patches (input CMYK & measured S) for cluster i using the following:

$$A_i^{(k+1)} = A_i^{(k)} + G_i^{(k+1)}(S_i^{(k+1)} - A_i^{(k)} V_i^{(k+1)}), \quad (2)$$

where $G_i^{(k+1)}$ is the gain vector for k+1 test patch. Note that the idea is to update the regression matrix $A_i^{(k+1)}$ from $A_i^{(k)}$ by a small amount based upon the additional input CMYK ($V_i^{(k+1)}$) and the measured S ($S_i^{(k+1)}$) of the k+1 test patch. Note also that one can also dynamically update the gain matrix $G_i^{(k+1)}$ to achieve least squared-errors in the estimation as derived in the above-referenced text: "*Control of Color Imaging Systems: Analysis and Design*".

The impact of the updated amount can be further controlled by a weighting on the gain factor to trade-off between robustness (i.e., the ability to ignore measurement noise) and adaptation (i.e., the ability to catch drift). If the model prediction for k+1 sample using regression matrix $A_i^{(k)}$ matches the actual measurement $S_i^{(k+1)}$, then $A_i^{(k+1)}$ would equal $A_i^{(k)}$ regardless of which update gain $P^{(k+1)}$ was chosen. Alternatively, a weighted sum of the original regression matrix can be used and the new regression matrix would be based on a set of new measurements. The weight can be a function of the number of training samples used in deriving the new regression matrix (or matrices). Such a weight would increase as the number of samples used in deriving the new regression matrix increased. For this level of updating, the number of samples can be as few as one sample per cluster using a recursive update.

Level 2: Update Regression Matrix and Cluster Center while Keeping the Number of Clusters Unchanged To update the center of the cluster in addition to the update of regression matrix, the regression matrix for each cluster should first be updated and then refine the cluster center by examining the prediction errors for samples near the boundary of the clusters. The latter step can be applied only if the samples near the boundary of the clusters are included in the critical test patches.

Example Color Management System

Figure 5:
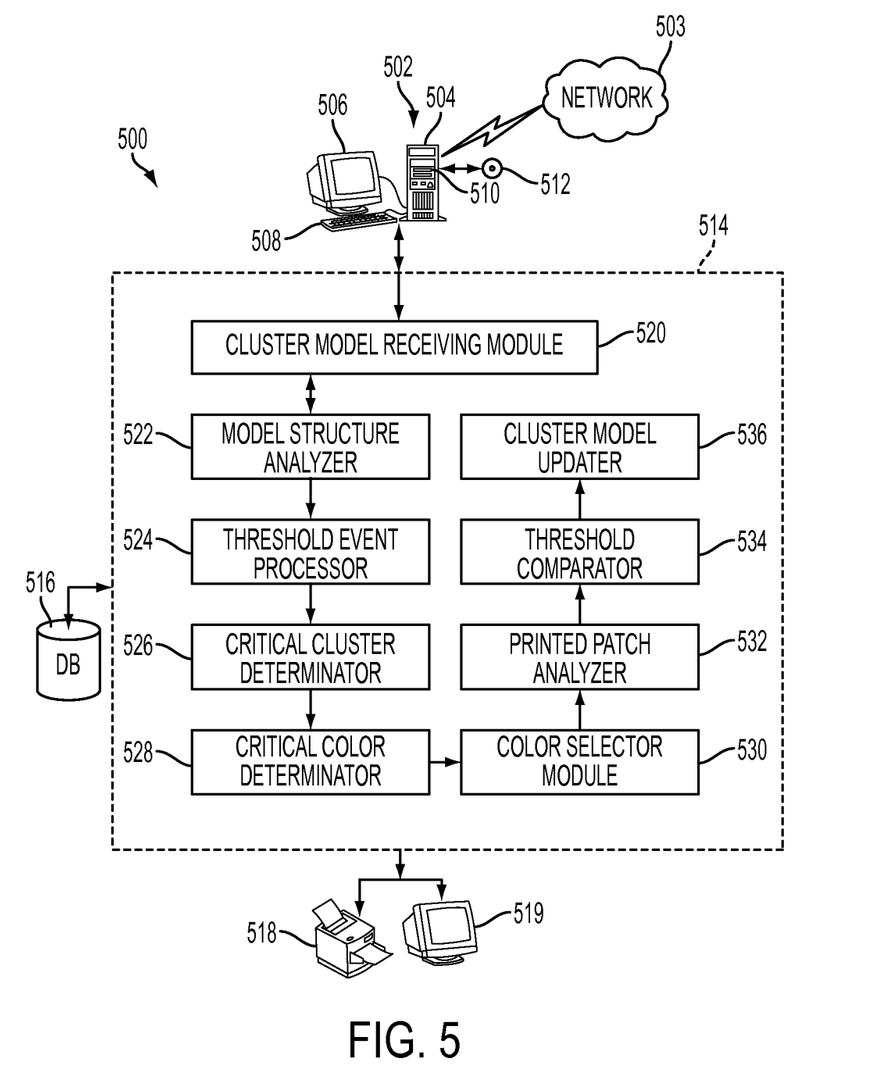
FIG. 5 is a block diagram of an example system for performing various aspects of the present method as described in the flow diagrams of FIGS. 3 and 4.

Reference is now being made to FIG. 5 which illustrates a block diagram of an example system for performing various aspects of the present method as shown and described with respect to the flow diagrams of FIGS. 3 and 4.

The color management system 500 is shown generally comprising a computer workstation 502 capable of receiving a user input and providing that selection to color management system 514 shown comprising a plurality of modules. Computer 502 is shown comprising a case 504 housing a motherboard, central processor unit (CPU), memory, network interface, one or more storage devices, and a communications link such as a network card to effectuate communication to remote devices over network 503. Workstation 502 also includes a graphical display 506 such as a CRT or LCD monitor, an alphanumeric keyboard 508, and a mouse (not shown) to enable a user to make a selection or identification as discussed above or to enter information about the cluster model. The workstation includes a media 512, such as a hard disk drive or CD-ROM, for storage of machine readable program instructions and executable programs and data for implementing various aspects of the methods described herein. The workstation can store/retrieve information to/from media 512 using R/W drive 510. The workstation is connected to one or more remote devices via network 503 over which values, records, and other data can be transmitted and/or received. Techniques for placing computer workstations in communication with remote devices over a network are well established and commonly understood. Data packets are transmitted using servers connected via a plurality of communication links. Data is transferred in the form of signals which may be, for example, electrical, electronic, electro-magnetic, optical, or other signals. These signals are transmitted by wire, cable, fiber optic, phone line, cellular link, RF, satellite, or any other medium or communications link known in the arts. Computer 502 may further execute server software or house server hardware. Server software and hardware are readily available from a variety of vendors in commerce. The computer system can be a personal computer or comprise any computing device capable of performing image processing operations in accordance herewith through hardware and/or software applications.

The networked image processing workstation 502 also includes database 516 for retrieving data records in response to a query. The database is capable of adding new data records, updating records, and displaying stored data and other information made available by the database engine. Since database construction, query optimization, indexing methods, and record retrieval techniques and algorithms are well known in the arts, a further discussion as to a specific database implementation is omitted. One of ordinary skill would be able to obtain a database engine known in the arts and place the database in communication with workstation 502 and print device 518. It should be appreciated that database 516 can be placed in communication with any of the devices or modules shown. The illustrated implementation is but one configuration. Values, attributes, mathematical routines, color recipes, color values, image quality parameters, look-up tables, and the like, may be retrieved by any of the illustrated modules from database 516.

Image processing system 500 is shown further comprising a color marking device 518 which includes monitor 519. Such a marking device is capable of reducing a signal of an image to a viewable form. Reducing an image of a document to a viewable form includes transmitting the image in the form of signals over a network connection, interface, or other communication pathway, for rendering. The step of providing the image to an output device is also intended to include storing those signals for subsequent retrieval.

Cluster Model Receiving Module 520 enables a user to identify at least one cluster model of interest intended to be processed in accordance with the teachings hereof, as described above at step 302 of the flow diagram of FIG. 3. The cluster model can be received from computer workstation 502, or retrieved from storage device 516, or obtained from a remote device over network 503. A user may enter information pertaining to some or all of the cluster model using a graphical user interface 506 and 508 of workstation 502. The cluster model may be obtained from the computer media 512. The received cluster model defines a plurality of clusters of the input color space of color marking device 518. Model Structure Analyzer 522 obtains the cluster model from module 520 and analyzes the structure of the received cluster model to identify the defined plurality of clusters contained therein Threshold Event Processor 524 determines whether a threshold event has occurred. Such an event may be, for example, when a print engine of color marking device 518 having drifted beyond a predetermined amount, or may initiate an event due to a passage of a predetermined amount of time. Processor 524 may be placed in communication with print device 518 via wired or wireless pathways. Critical Cluster Determination Module 526 determines at least one critical cluster from the plurality of clusters in response to a signal from Event Generator 524 and passes an index to the identified cluster to Critical Color Determination Module 528 wherein at least one critical color is identified from this critical cluster. Module 528 selects at least two color points near a boundary edge of the critical cluster and, for each of the selected color points, calculates the distance of this point from the center of the critical cluster; generates a vector to the center of the cluster; or obtains an output from the non-updated cluster model using this color point. Color Selector Module 530 identifies the critical color using either the calculated distance, a directionality of the generated vector, or an output obtained using the non-updated cluster model. Module 530 may further identify one or more critical colors in response to a user input via the graphical user interface of workstation 502. Once the critical colors have been identified, for each of a desired number of critical colors, a select number of patches is printed in that critical color and Patch Analyzer Module 532 receives color measurements obtained from the printed patches using a colorimeter or a spectrophotometer. Threshold Comparator 524 determines whether the color measurements indicate that a deviation has occurred such that color quality is below an acceptable threshold for this color marking device. If not then a determination is made whether any more colors from the set of identified critical colors remain to be processed. If a deviation has occurred then Cluster Model Updater 536 updates the cluster model. Updating the cluster model comprises any of: updating the regression matrix associated with the cluster wherein this selected critical color resides, or updating the regression matrix associated with one or more clusters in the cluster model; redefining a total number of clusters in the cluster model; redefining a center of the cluster wherein the selected color resides; redefining the centers of some or all of the clusters in the cluster model; or redefining a boundary of any of the clusters within the cluster model.

Various aspects of system 514 may reside, in whole or in part, within workstation 502 and/or in color marking device 518 or within a sub-system thereof. Such sub-systems may comprise a device controller, processor, electronic circuit, ASIC, a software application installed thereon, or the like.

It should be appreciated that any of the modules of FIG. 5 designate a system component comprised of software and/or hardware designed to perform one or more functions. A module may be implemented using a single software program comprising machine readable program instructions or a single unit of hardware such as an ASIC, electronic circuit, or special purpose computer system such as the system of FIG. 7. A plurality of modules may collectively perform a given function. Connections between modules may be physical or logical. A module may further comprise an operating system, drivers, device controllers, and other apparatuses some or all of which may be connected via a network.

Figure 6A:
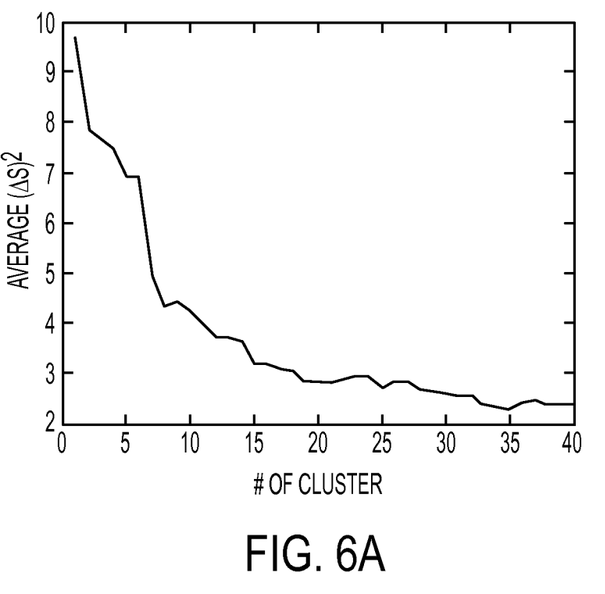
FIGS. 6A-B show smoothness cluster model accuracy as a function of cluster number for the print device at a first time (FIG. 6A) and for the print device at a second time (FIG. 6B)
Figure 6B:
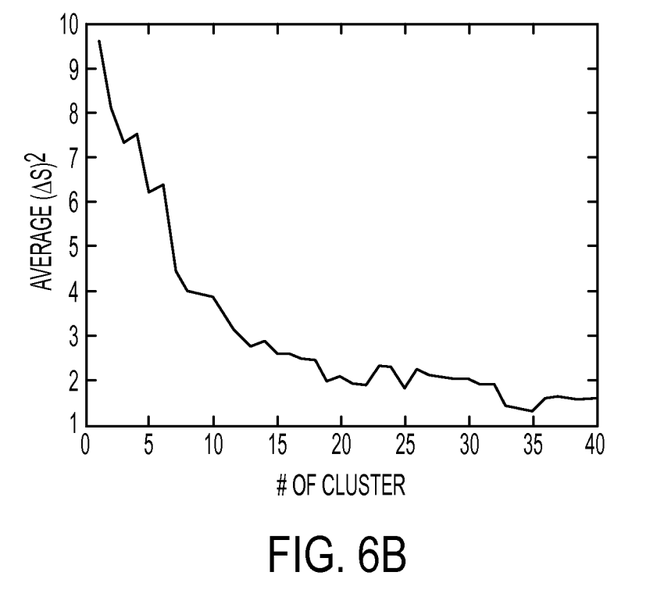

Performance Results:

To demonstrate the efficacy hereof, two runs of smoothness testing on a xerographic print device were conducted. Note that these were part of an L12 screening experiment where printer drift was simulated by replacing a new photoreceptor-belt with an older one and varying xerographic settings such as process control targets, fuser temperature, and toner age. Test prints with 1500 test patches were printed and measured for L*a*b* and S (smoothness in NMF) at both times. At a first time, a cluster model (FIG. 1) for with 20 clusters was derived. At a second time, several analyses were conducted, including: (1) all 1500 patches were used to re-derive the cluster model (baseline, ideal case), (2) only 25% of the patches are used as the critical test-patches and their corresponding measurements are used for level-1 update of the cluster model (this invention), (3) only 25% of the patches are used as the critical test-patches and their corresponding measurements are used for re-deriving the cluster model (alternative, this is not optimal), and (4) keep the model the same (assuming no drift), (baseline, worst case). The results are shown in FIGS. 6A-B and Table 1 using $(\Delta S)^2$ as the measure of performance. In FIG. 6A, smoothness cluster model accuracy is plotted as a function of number of clusters at a first time. In FIG. 6B smoothness cluster model accuracy is plotted as a function of number of clusters at the second time. Note that the point in (FIG. 6B) at 20 clusters is the model of Test 1 in TABLE 1. As shown, the model accuracy improves as number of clusters increases. The key results in TABLE 1 show results $(\Delta S)^2$ of 1500 patches of level-1 smoothness model update using a 20-cluster model.

TABLE 1

| Description | Test 1 Retrain with all data | Test 2 Update with 25% critical test patches | Test 3 Retrain with 25% critical test patches | Test 4 Ignore drift |
|---|---|---|---|---|
| Ave | 2.1 | 3.0 | 4.7 | 9.9 |
| P95 | 7.7 | 10.7 | 20.3 | 41.3 |
| Ave | 2.1 | 3.0 | 4.7 | 9.9 |
| P95 | 7.7 | 10.7 | 20.3 | 41.3 |

As shown in TABLE 1, it is clear that the best performance comes from retraining at the second time with a large training set (rebuild rather than update) [Test1]. It is encouraging that using the update strategy hereof with only 25% of the measurement cost, one can achieve a similar performance (only slightly degraded) [Test2]. The benefit is especially evident when compared to the alternative where the same reduced number of measurements are used but the updating strategy is not applied [Test3]. The data also show that when printer drift is ignored, very large errors can result [Test4].

Example Special Purpose Computer

Figure 7:
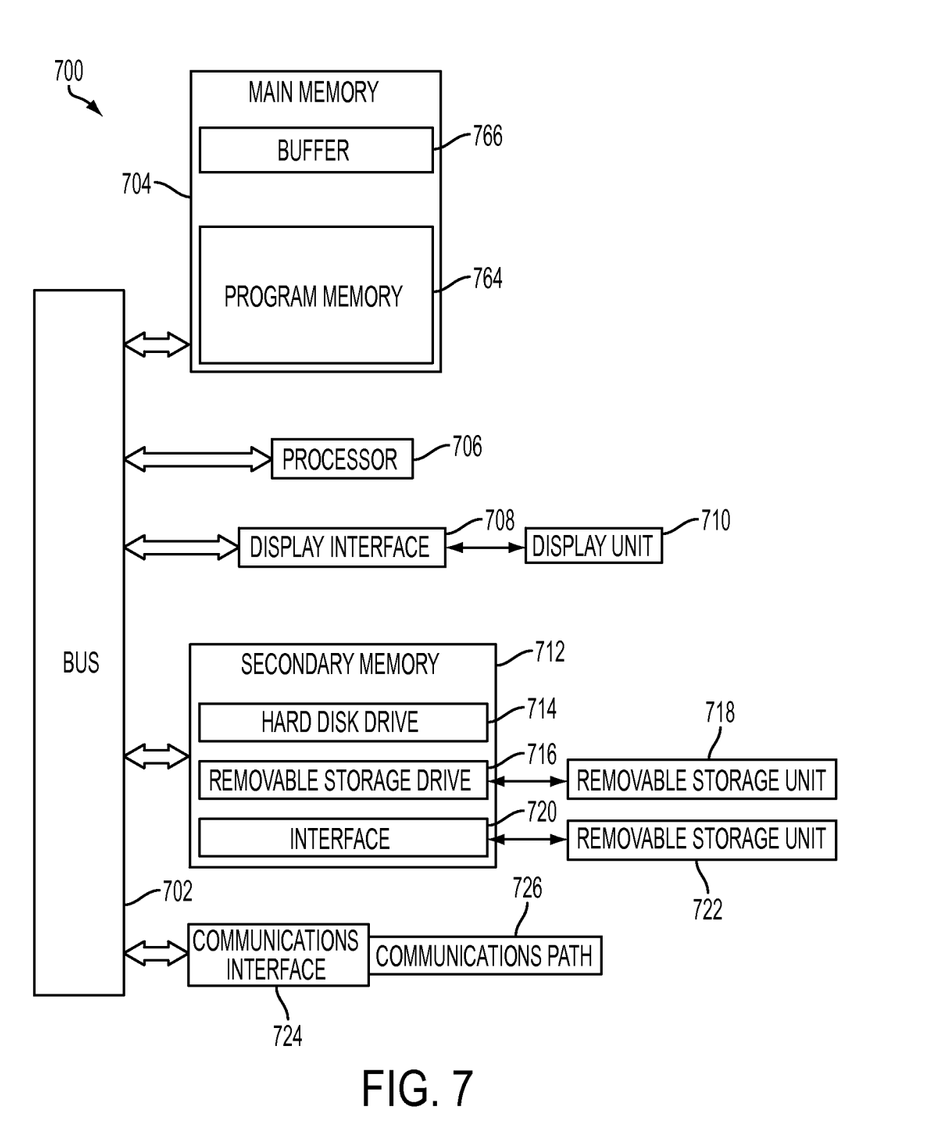
FIG. 7 illustrates a block diagram of one example embodiment of a special purpose computer system for performing one or more aspects of the present system and method as described with respect to the example flow diagrams of FIGS. 3 and 4 and the example functional block diagram of FIG. 5.

Reference is now being made to FIG. 7 which illustrates a block diagram of one example embodiment of a special purpose computer system for performing one or more aspects of the present system and method as described with respect to the example flow diagrams of FIGS. 3 and 4, and the system of FIG. 5. Such a special purpose processor is capable of executing machine readable program instructions for carrying out one or more aspects of the present method and may comprise any of a micro-processor or micro-controller, ASIC, electronic circuit, or special purpose computer system. All or portions of the flow diagram of FIGS. 2 and 3, and the block diagram of FIG. 5, as illustrated and described herein, may be implemented partially or fully in hardware in conjunction with machine executable instructions in communication with various components of such a system.

Special purpose computer system 700 includes processor 706 for executing machine executable program instructions for carrying out all or some of the various aspects of the present method. The processor is in communication with bus 702. The system includes main memory 704 for storing machine readable instructions. Main memory may comprise random access memory (RAM) to support reprogramming and flexible data storage. Buffer 766 stores data addressable by the processor. Program memory 764 stores program instructions. A display interface 708 forwards data from bus 702 to display 710. Secondary memory 712 includes a hard disk 714 and storage device 716 capable of reading/writing to removable storage unit 718, such as a floppy disk, magnetic tape, optical disk, etc. Secondary memory 712 further includes other mechanisms for allowing programs or other machine executable instructions to be loaded into the processor. Such mechanisms may include, for example, a storage unit 722 adapted to exchange data through interface 720 which enables the transfer of software and data to the processor. The system includes a communications interface 724 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 726 which carries such signals and may be implemented using wire, fiber optic cable, phone line, cellular link, RF, memory, or other means known in the arts.

It should be appreciated that various of the above-disclosed and other features and functions, or alternatives thereof, may be desirably combined into many other different systems or applications. The above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting.

Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a photocopier, a driver, a scanner, a photographic system, a xerographic device, or the like. The methods provided herein can also be implemented by physical incorporation into an image processing or color management system. Furthermore, the teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator or other image processing devices.

One or more aspects of the methods described herein are intended to be incorporated in an article of manufacture, including one or more computer program products, having computer usable or machine readable media. The article of manufacture may be included on at least one storage device readable by a machine architecture or other xerographic or image processing system embodying executable program instructions capable of performing the methodology described herein. The article of manufacture may be included as part of a xerographic system, an operating system, a plug-in, or may be shipped, sold, leased, or otherwise provided separately either alone or as part of an add-on, update, upgrade, or product suite.

It will be appreciated that various of the above-disclosed and other features and functions, or alternatives thereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications are each separately hereby incorporated by reference in their entirety.

What is claimed is:

1. A method for updating a smoothness constrained cluster model for color control in a color management system, the method comprising:

receiving a cluster model designed for a color marking device;

analyzing a structure of said cluster model to identify a plurality of clusters defined therein, each of said clusters being identified by at least one centroid of an input color space of said color marking device, each cluster having an associated transform comprising a regression matrix that is associated with each of said plurality of clusters; and in response to a threshold event having occurred:

identifying at least one critical cluster from said plurality of clusters;

identifying at least one critical color from said critical cluster, wherein identifying said critical color comprises selecting, from among at least two color points belonging to said critical clusters, a subset of color points based on a selection criterion comprising at least one of:

sensitivity of said transform at said critical color;

a calculated distance of said critical color from a centroid of said critical cluster; and directionality of a vector of said critical color to said centroid;

printing a selected number of patches in said critical color;

obtaining any of: a color and smoothness measurements, from said printed patches; and updating said cluster model in response to any of: said color and smoothness measurements having deviated beyond a defined threshold, wherein updating said cluster model comprises any of:

updating the transform associated with any of said clusters;

redefining a total number of clusters in said cluster model;

redefining a center of any of said clusters; and redefining a boundary of any of said clusters.

2. The method of claim 1, wherein said threshold event comprises any of:

a print engine of said color marking device having drifted beyond a predetermined amount, and a passage of a predetermined amount of time.

3. A system for updating a smoothness constrained cluster model for color control in a color management system, the system comprising:

a memory and a storage medium; and a processor in communication with said storage medium and said memory, said processor executing machine readable instructions for performing the method of:

receiving a cluster model designed for a color marking device;

analyzing a structure of said cluster model to identify a plurality of clusters defined therein, each of said clusters being identified by at least one centroid of an input color space of said color marking device, each cluster having an associated transform comprising a regression matrix that is associated with each of said plurality of clusters; and in response to a threshold event having occurred:
identifying at least one critical cluster from said plurality of clusters;
identifying at least one critical color from said critical cluster, wherein identifying said critical color comprises selecting, from among at least two color points belonging to said critical clusters, a subset of color points based on a selection criterion comprising at least one of:
sensitivity of said transform at said critical color;
a calculated distance of said critical color from a centroid of said critical cluster; and
directionality of a vector of said critical color to said centroid;
printing a selected number of patches in said critical color;
obtaining any of: a color and smoothness measurements, from said printed patches; and
updating said cluster model in response to any of: said color and smoothness measurements having deviated beyond a defined threshold,
wherein updating said cluster model comprises any of:
updating the transform associated with any of said clusters;
redefining a total number of clusters in said cluster model;
redefining a center of any of said clusters; and
redefining a boundary of any of said clusters.

4. The system of claim 3, wherein said threshold event comprises any of:
a print engine of said color marking device having drifted beyond a predetermined amount, and
a passage of a predetermined amount of time.

* * * * *